US011755313B2

(12) United States Patent
Matousek

(10) Patent No.: US 11,755,313 B2
(45) Date of Patent: Sep. 12, 2023

(54) IMPLEMENTING CHANGES MADE TO SOURCE CODE OF RELOADABLE TYPES AT RUNTIME

(71) Applicant: Microsoft Technology Licensing, LLC, Redmond, WA (US)

(72) Inventor: Tomas Matousek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 17/373,391

(22) Filed: Jul. 12, 2021

(65) Prior Publication Data

US 2023/0019235 A1    Jan. 19, 2023

(51) Int. Cl.
*G06F 8/656* (2018.01)
*G06F 8/71* (2018.01)

(52) U.S. Cl.
CPC .............. *G06F 8/656* (2018.02); *G06F 8/71* (2013.01)

(58) Field of Classification Search
CPC .................................. G06F 8/656; G06F 8/71
See application file for complete search history.

(56) References Cited

U.S. PATENT DOCUMENTS

| | | | |
|---|---|---|---|
| 8,707,287 B2* | 4/2014 | Raundahl Gregersen | G06F 8/656 717/170 |
| 10,146,515 B1* | 12/2018 | Sundresh | G06F 8/48 |
| 11,409,508 B1* | 8/2022 | Toub | G06F 11/3624 |
| 2010/0199259 A1* | 8/2010 | Quinn | G06F 9/44536 717/106 |
| 2014/0059528 A1* | 2/2014 | Gagliardi | G06F 8/656 717/170 |
| 2014/0173583 A1* | 6/2014 | Follis | G06F 9/44536 717/170 |
| 2014/0289707 A1* | 9/2014 | Guan | G06F 11/3624 717/124 |
| 2015/0100951 A1* | 4/2015 | Raundahl Gregersen | G06F 9/44521 717/166 |
| 2017/0249141 A1* | 8/2017 | Parees | G06F 11/3668 |
| 2022/0100488 A1* | 3/2022 | Douglas | G06F 8/63 |
| 2022/0137987 A1* | 5/2022 | Chen | G06F 9/44521 719/331 |

OTHER PUBLICATIONS

Matousek, Tomas, "EnC: Emit Addition Instead of In-Place Update for Edits in Reloadable Types", Retrieved From https://github.com/dotnet/roslyn/issues/49006, Oct. 29, 2020, 2 Pages.

(Continued)

*Primary Examiner* — Isaac Tuku Tecklu

(57) ABSTRACT

Systems and methods for implementing changes made to source code of a program at runtime are provided. In particular, a computing device may execute the source code in a runtime environment and detect changes made to the source code at runtime in the runtime environment. In response to detecting the changes, the computing device may determine if the changes were made to a type in the source code identified as reloadable. In response to determining that the changes were made to the type in the source code identified as reloadable, the computing device may create a new version of the type and perform implementation of the changes to the source code at runtime using the new version of the type.

20 Claims, 7 Drawing Sheets

(56) References Cited

OTHER PUBLICATIONS

"International Search Report Written Opinion Issued in PCT Patent Application No. PCT/US22/035398", dated Oct. 20, 2022, 13 Pages.

Raudjarav, et al., "JRebel.Android: Runtime Class- and Resource Reloading for Android", In Proceedings of IEEE/ACM 37th IEEE International Conference on Software Engineering, May 16, 2015, pp. 741-744.

* cited by examiner

IMPLEMENTING CHANGES MADE TO SOURCE CODE OF RELOADABLE TYPES AT RUNTIME

BACKGROUND

Various types of software development tools allow software developers to make changes to source code of an application while a program is in a break mode during a debugging session. If any defects or problems that prevent correct operation of the source code are found during the debugging session, the software developers may make changes to the source code to resolve them. In some cases, the changes may be made without the debugger attached. Yet, another scenario is when the debugger is attached but the program may not be suspended in a break mode when the changes are made. In such cases, once the changes to the source code are received, the changes may be applied to the source code of a type in-place. In other words, the source code is being overwritten as the changes are being applied to the source code of the type. Once the changes have been made and the software developers resume the application, the runtime representation of the type and its existing instances are updated to reflect the changes. This allows the software developers to make changes to the source code without having to stop, recompile the entire program, and restart the debugging session. However, a set of allowed edits is limited due to an inherent complexity of updating the runtime representations of the type and its instances.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

The present disclosure relates to hot reload, which decreases an inner loop of a developer development cycle by allowing the developer to modify a program without stopping, reloading, and restarting the program. More particularly, the present disclosure teaches the ability to hot reload where a type (e.g., a class) has changed. To implement this idea, the UI framework and the .NET runtime may both be updated.

In accordance with at least one example of the present disclosure, a method for implementing changes made to source code of a program at runtime is provided. The method may include executing the source code in a runtime environment, detecting changes made to the source code at runtime in the runtime environment, determining if the changes were made to a type in the source code identified as reloadable, creating, in response to determining that the changes were made to the type in the source code identified as reloadable, a new version of the type, and performing implementation of the changes to the source code at runtime using the new version of the type.

In accordance with at least one example of the present disclosure, a computing device for implementing changes made to source code of a program at runtime is provided. The computing device may include a processor and a memory having a plurality of instructions stored thereon that, when executed by the processor, causes the computing device to execute the source code in a runtime environment, detect changes made to the source code at runtime in the runtime environment, determine if the changes were made to a type in the source code identified as reloadable, create, in response to determination that the changes were made to the type in the source code identified as reloadable, a new version of the type, and perform implementation of the changes to the source code at runtime using the new version of the type.

In accordance with at least one example of the present disclosure, a non-transitory computer-readable medium storing instructions for implementing changes made to source code of a program at runtime is provided. The instructions when executed by one or more processors of a computing device, cause the computing device to execute the source code in a runtime environment, detect changes made to the source code at runtime in the runtime environment, determine if the changes were made to a type in the source code identified as reloadable, create, in response to determination that the changes were made to the type in the source code identified as reloadable, a new version of the type, and perform implementation of the changes to the source code at runtime using the new version of the type.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, a software development system allows a user (e.g., developer, programmer, designer, and/or coder) to develop or modify a program using an application framework, which includes a software framework to implement a standard structure of the application software. The software development system of the present disclosure is configured to implement changes made to source code of the program while the program is running. Specifically, the software development system allows the user to modify particular types in the source code at runtime without stopping, reloading, and restarting the entire program.

To do so, the particular types may be marked as reloadable in the source code or in database libraries. In some aspects, the database libraries may be associated with the application framework. When the changes are made to source code of a reloadable type, the changes may result in creating a new version of the reloadable type instead of applying the changes in-place (e.g., updating the type in-place), and the new version of the reloadable type may replace a previous version of the type. To do so, for example, the application framework may replace runtime representations and existing instances of the previous version of the reloadable type in the source code with the new version of the reloadable type. By creating the new version of the type that reflects the changes made to the source code, the user may be able to make changes to the source code during runtime without being constrained by the limitations of in-place updates.

Figure 1:
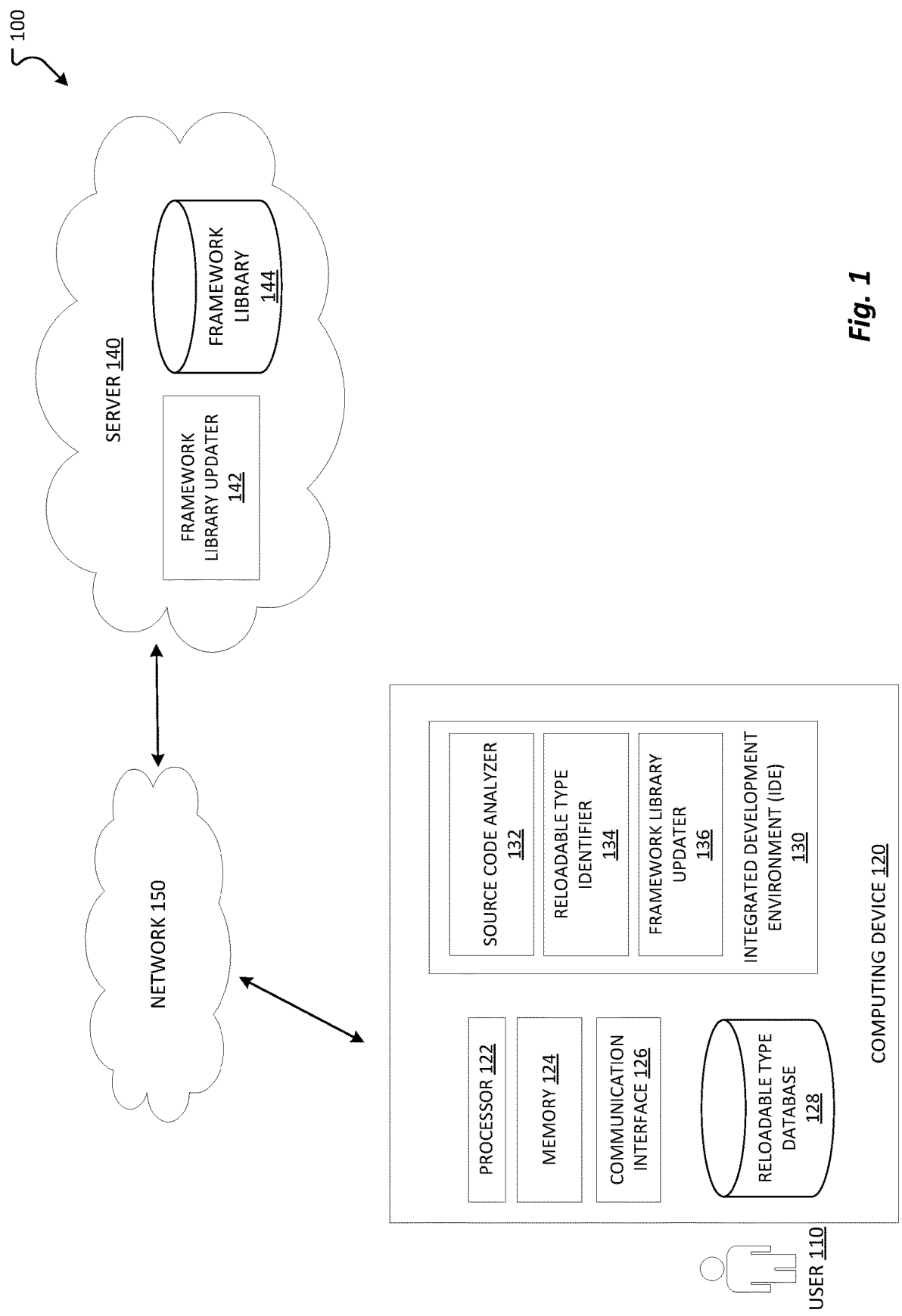
FIG. 1 depicts details directed to a software development system in accordance with examples of the present disclosure.

FIG. 1 depicts a software development system 100 for implementing changes made by a user 110 to source code at runtime in accordance with examples of the present disclosure. To do so, the software development system 100 includes a computing device 120 associated with the user 110 and one or more remote devices, such as a server 140, that are communicatively coupled to the computing device 120 via a network 150. The network 150 may include any kind of computing network including, without limitation, a wired or wireless local area network (LAN), a wired or wireless wide area network (WAN), and/or the Internet.

The computing device 120 includes an integrated development environment (IDE) 130 executing on a computing device 120 having a processor 122, a memory 124, and a communication interface 126. The IDE 130 may allow the user 110 to design, code, compile, test, run, edit, debug or build a software program, set of programs, web sites, web applications, and web services in a computer system. Software programs may include source code, created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk, and the like). The IDE 130 may provide a native code development environment or may provide a managed code environment that runs on a virtual machine. For example, the IDE 130 may provide a managed code development environment using the .NET framework. In the illustrative embodiment, the IDE 130 may be configured to develop applications for use with, for example, .NET framework and/or UI framework. To implement the changes made to source code of reloadable types at runtime, the UI framework and the .NET runtime may both be updated.

For example, the .NET Framework is updated with an attribute that designates a specific type as reloadable and an attribute that designates a specific type as a receiver of update notifications. The update notification includes information about the types that have been updated. It should be appreciated that the attribute is a marker that may be placed on any type.

The UI framework defines specific types that represent UI elements. Those specific types that the UI framework is able to reload are marked by the above attribute. The UI framework implements a type that is designed to receive update notifications from the runtime. Upon retrieval of such notification, the UI framework replaces all updated reloadable types in its data structures with their corresponding new versions that include the updates. It should be appreciated that the usage pattern of reloadable types is such that allows the types to be replaced with their new versions. In other words, the user code that references these types will reference them indirectly (e.g. via a base type, an interface, or dynamic dispatch) rather than directly referencing specific version of the type.

To do so, the IDE 130 further includes a source code analyzer 132, a reloadable type identifier 134, and a framework library updater 136. The source code analyzer 132 is configured to analyze source code of a program loaded in the IDE 130 to detect changes made by the user 110 at runtime. In the illustrative aspect, the user 110 may use the IDE 130 to make changes to the source code while the program is running. The changes may be implemented at runtime without stopping, reloading/recompiling, and restarting the entire program depending on metadata that indicates a type of source code that the changes have been made to. As described above and further below, certain types of source code are capable of being reloaded and thus can be arbitrarily updated while the program is running. Such reloadable types of source code allow the user 110 to edit the program at runtime with less restrictions compared to those types that are being updated in-place.

The reloadable type identifier 134 is configured to determine whether the changes made to the source code are made to the source code of one or more reloadable types. For example, the user 110 may create one or more reloadable types by annotating certain types as being reloadable during development process. Alternatively, or additionally, the framework may include reloadable type database of predefined types that are capable of being reloaded. For example, developers of an application framework may create one or more types, identify certain types as being reloadable, and store the identified reloadable types in the reloadable type database. Such reloadable type database may be received from another computing device (e.g., a server 140). The server 140 may be one or more cloud servers.

The framework library updater 136 is configured to transmit a notification including metadata to another device (e.g., a server 140) indicating changes in the source code of reloadable types. The changes made to the source code of a reloadable type generate a new version of the reloadable type, which is included in the metadata that is sent to the framework. In some aspects, the notification is sent to the server 140 and the framework may be updated via a framework library updater 142 of the server 140. The new version of a reloadable type is stored in the framework library (e.g., reloadable type database 128 and/or framework library 144). In response, the framework creates a new type (e.g., a new version of the type) that has its own runtime representation. When the UI framework is notified of the update of the reloadable type, the UI framework replaces all references it has to the older version of the type with the new one. When UI is refreshed, the UI framework identifies what type implements a particular UI element and fetches that type from its data structures. This would be the latest version of the type. Subsequently, the UI framework executes code in the type that renders the UI of the element. This allows the changes to be implemented immediately while the program is running.

An example of a framework that may use reloadable types is Razor. Razor is a framework used to create web applications and/or web pages. Razor enables the programmers to use an HTML construction workflow. In the example shown below, Microsoft.AspNetCore.Mvc.RazorPages.Page is a base type of user defined types that represents web pages. This type is usually generated from .razor file, which describes the page in Razor language. This is automatically translated to C# to code that looks like the following:

```
public class MyPage : Microsoft.AspNetCore.Mvc.RazorPages.Page
{
public async override Task ExecuteAsync( )
    {
       // ... code that builds up the HTML content of the page ...
    }
}
```

When the user 110 updates .razor file (e.g. changes a title of the page) the source of the above type is automatically updated accordingly. Razor comments are processed on the server 140 before the page is sent to the browser. To allow these updates to take effect immediately while the web application is running, the Razor framework marks the base type Microsoft.AspNetCore.Mvc.RazorPages.Page as reloadable, so that all subtypes of Page become reloadable. This eliminates the need to terminate, recompile, and execute the application again and avoids any constraints on the updates that can be performed in-place.

In another example of reloadable type is a Model-View-Update (MVU) pattern. Comet UI framework is built using the MVU pattern. It provides a View class that application UI views derive from like the following:

```
public class MyView : View
{
    [Body]
    View body ( ) => new Text("Hello World");
}
```

The Comet framework marks View type as "reloadable" to allow the user 110 to update the view while the application is running.

Figure 2:
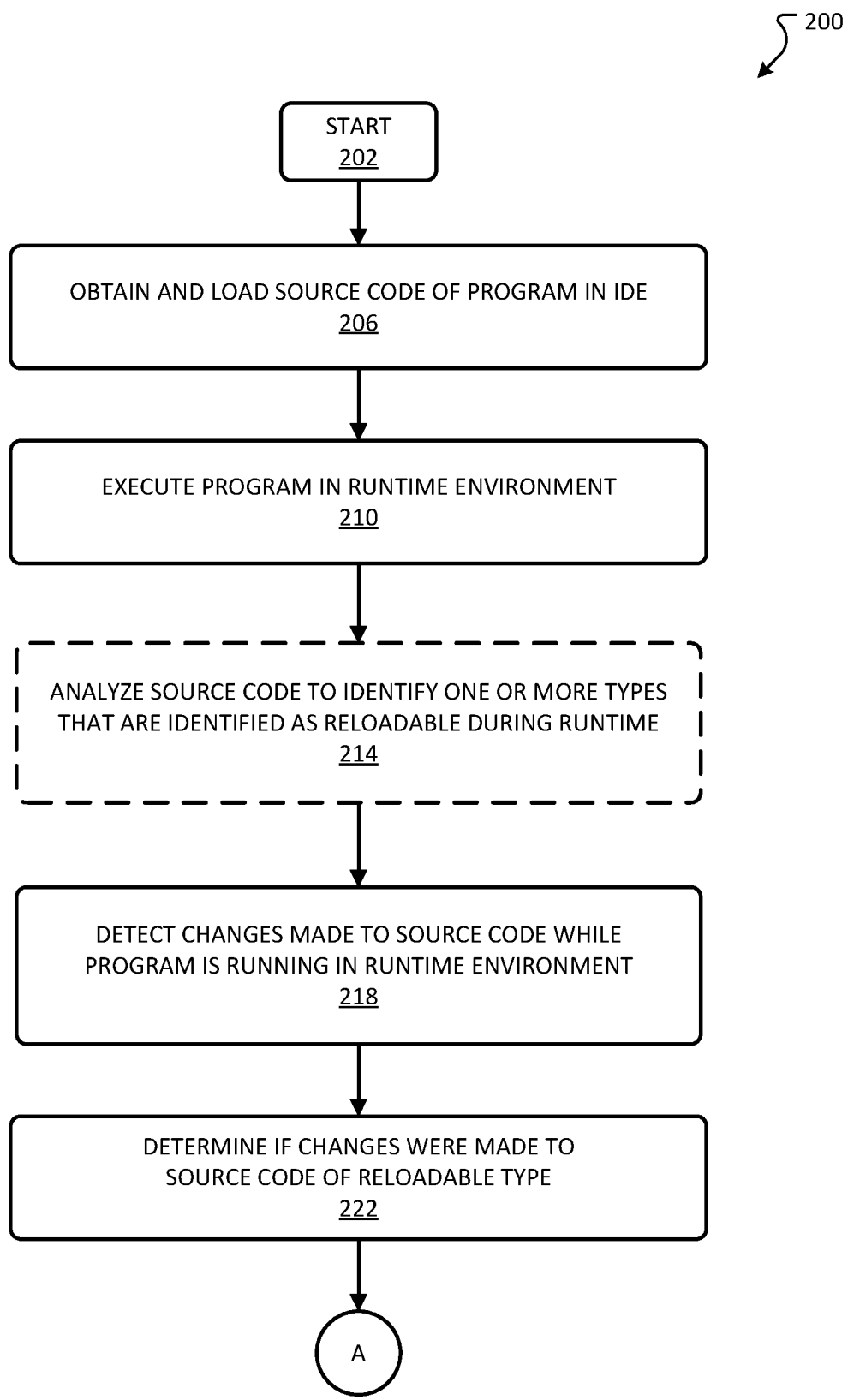
FIGS. 2 and 3 depict a method directed to implementing changes made to source code of reloadable types at runtime in accordance with examples of the present disclosure.
Figure 3:
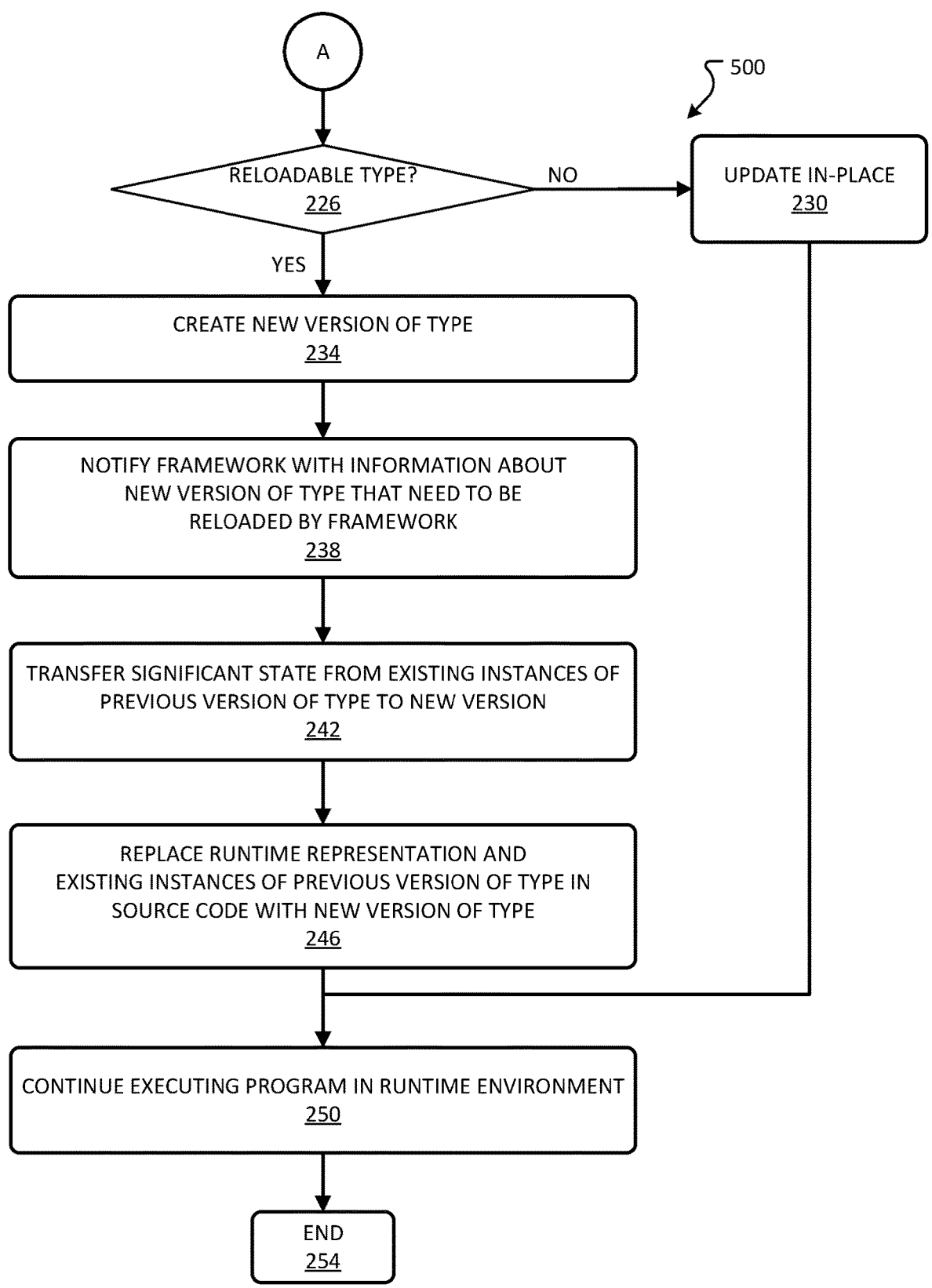

Referring now to FIGS. 2 and 3, a method 200 for implementing changes made to source code of a program while the program is running in accordance with examples of the present disclosure is provided. A general order for the steps of the method 200 is shown in FIGS. 2 and 3. Generally, the method 200 starts at 204 and ends at 254. The method 200 may include more or fewer steps or may arrange the order of the steps differently than those shown in FIGS. 2 and 3. In the illustrative aspect, the method 200 is performed by a computing device (e.g., a user device 120) of a user 110.

Specifically, in some aspects, the method 200 may be performed by an integrated development environment (IDE) (e.g., 130) executed on the user device 120. For example, the computing device 120 may be, but is not limited to, a computer, a notebook, a laptop, a mobile device, a smartphone, a tablet, wearable, or any other suitable computing device that is capable of communicating with the server 140. For example, the server 140 may be any suitable computing device that is capable of communicating with the computing device 120. The method 200 can be executed as a set of computer-executable instructions executed by a computer system and encoded or stored on a computer readable medium. Further, the method 200 can be performed by gates or circuits associated with a processor, Application Specific Integrated Circuit (ASIC), a field programmable gate array (FPGA), a system on chip (SOC), or other hardware device. Hereinafter, the method 200 shall be explained with reference to the systems, components, modules, software, data structures, user interfaces, etc. described in conjunction with FIG. 1.

The method 200 starts at 202, where flow may proceed to 206. At 206, the computing device 120 obtains or constructs source code of a program in an integrated development environment (IDE) (e.g., 124). In some aspects, the source code may be constructed within a software framework (e.g., .NET framework). For example, the source code may be provided by the user 110. Alternatively, the source code may be received or obtained from the server 140. Once the source code is obtained, the source code is loaded in the IDE 124. For example, the IDE 124 may be Microsoft® Visual Studio®, Eclipse, Microsoft® Office, or any other IDE, executing on the computing device 120.

Subsequently, at 210, the source code is executed in a runtime environment provided by the IDE 124. In some aspects, the computing device 120 may analyze the source code to identify one or more types that are identified as reloadable during the runtime. For example, the user may create one or more types and annotate those types as being reloadable during development process. Alternatively, or additionally, the software framework may include a reloadable type library or database of predefined types that are capable of being reloaded at runtime. The reloadable type database may be received from another computing device (e.g., a server 140). Alternatively, or additionally, developers of the software framework may create one or more types, identify certain types as being reloadable, and store the identified reloadable types in the reloadable type database.

At 218, while the program is running within the runtime environment, the computing device 120 detects one or more changes to the source code made by the user 110. When the one or more changes are detected, the computing device 120 determines if the one or more changes were made to the source code of a reloadable type, as described in operation 222. As described above, the reloadable type database 128 associated with the software framework may include predefined types that are capable of being reloaded at runtime. In such aspects, the computing device 120 determines if the one or more changes were made to the source code of reloadable type based in part on the reloadable type database 128. Additionally, or alternatively, particular types in the source code may be identified and annotated by the user 110 prior to and/or during the runtime as being reloadable types of the source code. Additionally, or alternatively, the user 110 may create new types and annotate the new types as reloadable. Subsequently, the method 200 proceeds to operation 226 in FIG. 3 as shown by the alphanumeric character A in FIGS. 2 and 3

At 226, if the computing device 120 determines that the changes are not in reloadable types of the source code, the method 200 proceeds to operation 230 to apply the changes made to the source code of a non-reloadable type in-place. In other words, the runtime representation of the non-reloadable type and all its existing instances are updated to reflect the changes. However, as described above, a set of allowed in-place edits is limited due to inherent complexity of updating the runtime representations of the type and its instances. The method 200 then skips ahead to operation 250 to continue executing the program in the runtime environment with the updated source code.

Referring back to operation 226, if the computing device 120 determines that the changes are made in a reloadable type of the source code, the method 200 proceeds to operation 234. At 234, the computing device 120 creates a new type (e.g., a new version of the reloadable type) based on the changes.

Subsequently, at 238, the computing device 120 notifies the software framework with information (e.g., metadata) about the new version of the type that needs to be reloaded by the software framework. In response to receiving the notification, at 242, the software framework transfers a significant state (e.g., member variables), if any, from the previous instances of the reloadable type to the new version of the reloadable type.

At 246, the computing device 120 replaces the runtime presentations and the existing instances of the previous version of the reloadable type in the source code with the new version of the reloadable type.

Subsequently, at 250, the computing device 120 continues executing the program in the runtime environment after implementing the changes while the program is running. This allows the user 110 to make changes to the source code at runtime without stopping, reloading, and restarting the entire program.

Figure 4:
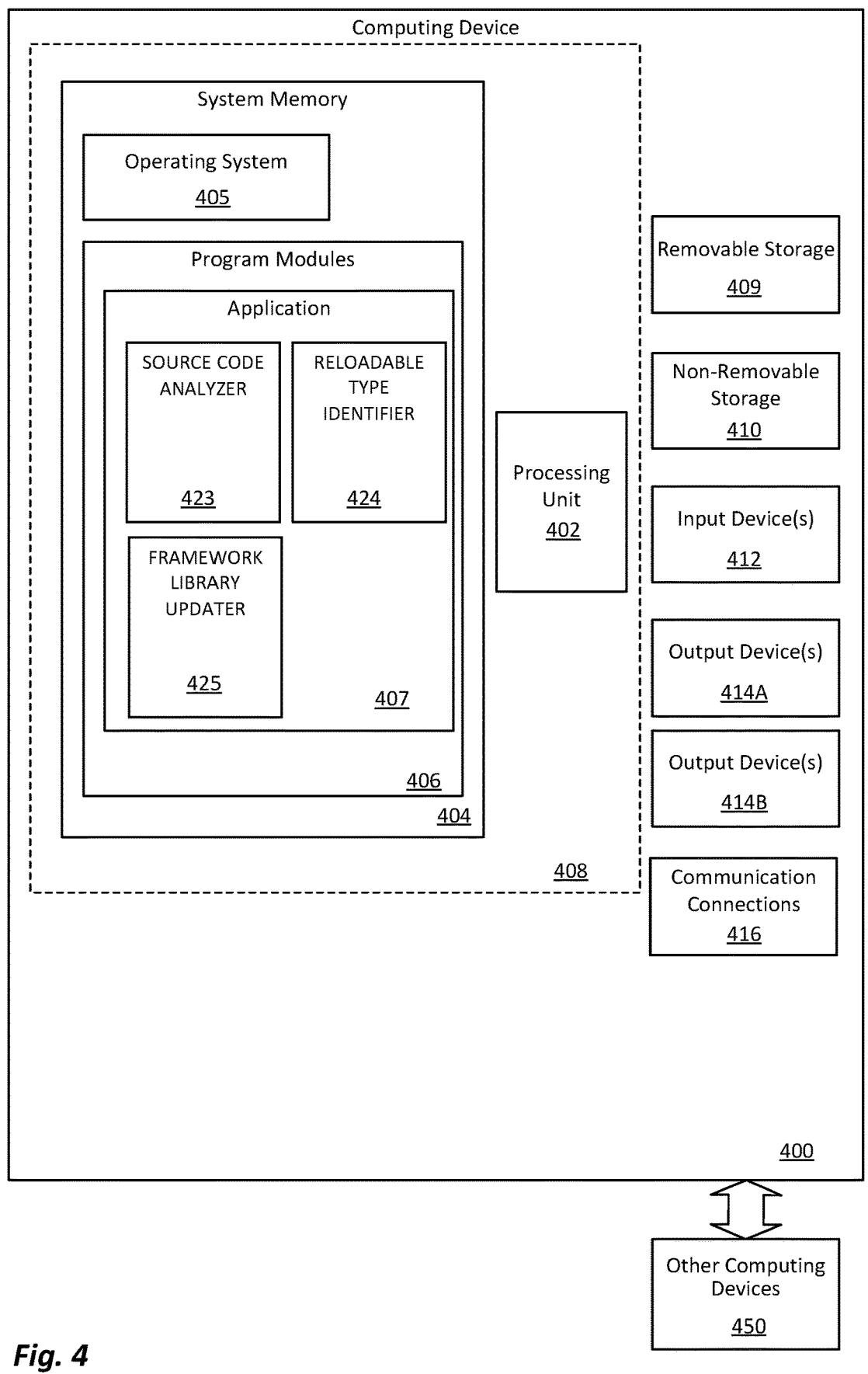
FIG. 4 depicts block diagram illustrating physical components (e.g., hardware) of a computing device with which aspects of the disclosure may be practiced.
Figure 5A:
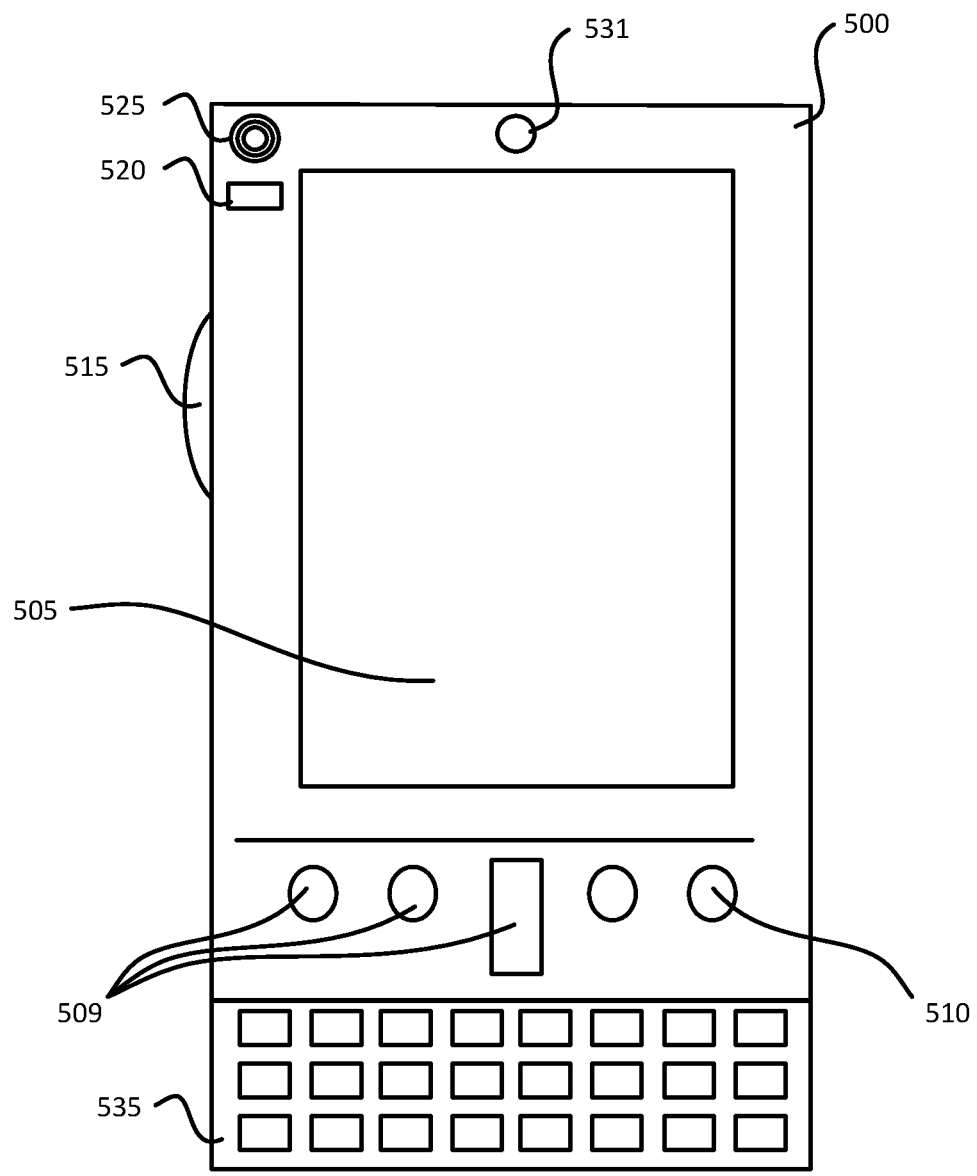
FIG. 5A illustrates a first example of a computing device with which aspects of the disclosure may be practiced.
Figure 5B:
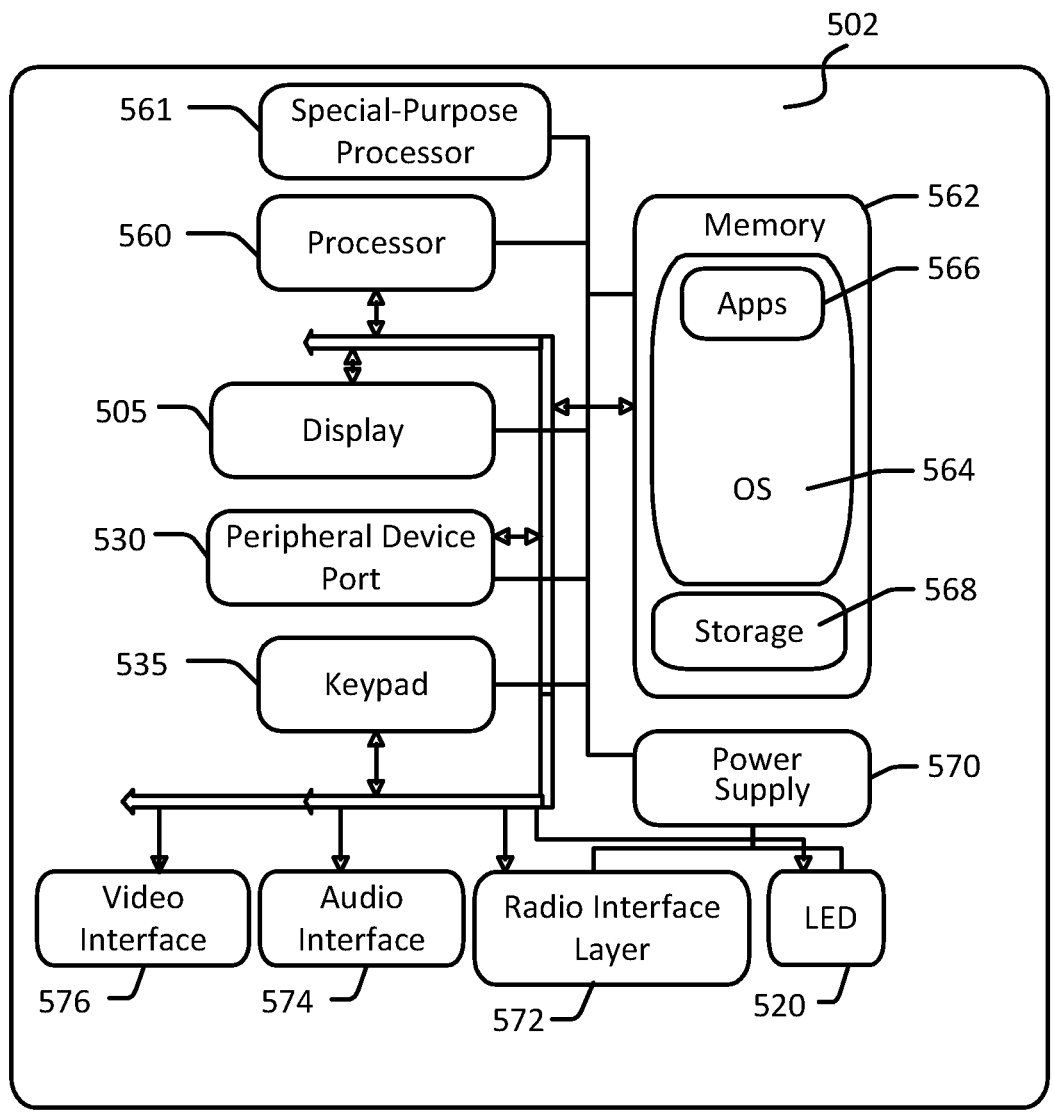
FIG. 5B illustrates a second example of a computing device with which aspects of the disclosure may be practiced.
Figure 6:
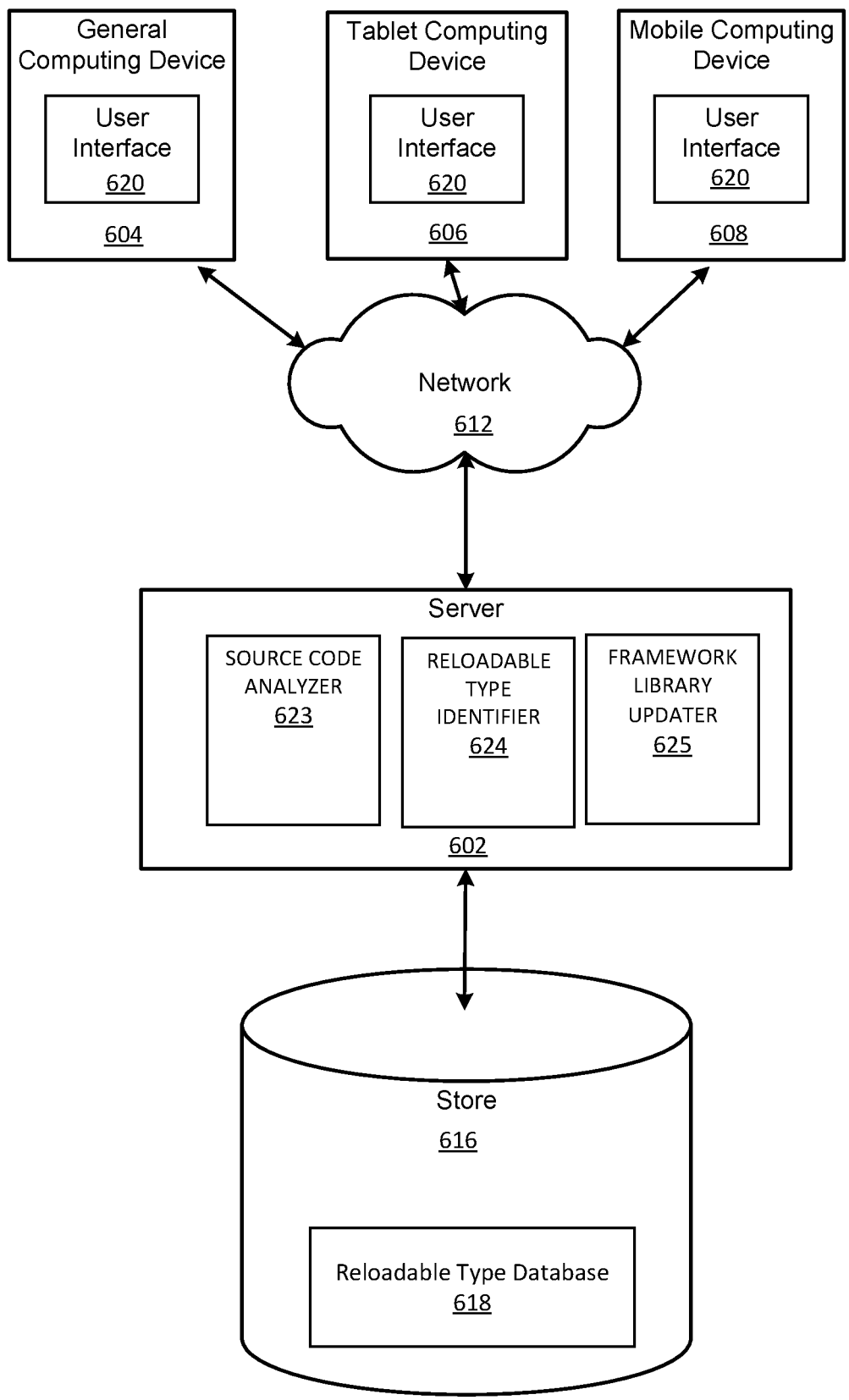
FIG. 6 illustrates at least one aspect of an architecture of a system for processing data in accordance with examples of the present disclosure.

FIGS. 4-6 and the associated descriptions provide a discussion of a variety of operating environments in which aspects of the disclosure may be practiced. However, the devices and systems illustrated and discussed with respect to FIGS. 4-6 are for purposes of example and illustration and are not limiting of a vast number of computing device configurations that may be utilized for practicing aspects of the disclosure, described herein.

FIG. 4 is a block diagram illustrating physical components (e.g., hardware) of a computing device 400 with which aspects of the disclosure may be practiced. The computing device components described below may be suitable for the computing devices described above. For example, the computing device 400 may represent the computing device 120 of FIG. 1. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories.

The system memory 404 may include an operating system 405 and one or more program modules 406 suitable for performing the various aspects disclosed herein such. The operating system 405, for example, may be suitable for controlling the operation of the computing device 400. Furthermore, aspects of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, several program modules and data files may be stored in the system memory 404. While executing on the at least one processing unit 402, the program modules 406 may perform processes including, but not limited to, one or more aspects, as described herein. The application 420 includes a source code analyzer 423, a reloadable type identifier 424, a framework library updater 425, as described in more detail with regard to FIG. 1. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. The output device(s) 414A such as a display, speakers, a printer, etc. may also be included. An output 414B, corresponding to a virtual display may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a computing device or mobile computing device 500, for example, a mobile telephone, a smart phone, wearable computer (such as a smart watch), a tablet computer, a laptop computer, and the like, with which aspects of the disclosure may be practiced. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 509/510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some aspects. In yet another alternative aspect, the mobile computing device 500 is a portable phone system, such as a cellular phone. The mobile computing device 500 may also include an optional keypad 535. Optional keypad 535 may be a physical keypad or a "soft" keypad generated on the touch screen display. In various aspects, the output elements include the display 505 for showing a graphical user interface (GUI), a visual indicator 531 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports 530, such as an audio input (e.g., a microphone jack), an audio output (e.g., a headphone jack), and a video output (e.g., a HDMI port) for sending signals to or receiving signals from an external source.

FIG. 5B is a block diagram illustrating the architecture of one aspect of computing device, a server, or a mobile computing device. That is, the mobile computing device 500 can incorporate a system (902) (e.g., an architecture) to implement some aspects. The system 502 can implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and/or one or more components supported by the systems described herein. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g. a source code analyzer 423, a reloadable type identifier 424, a framework library updater 425, etc.).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated configuration, the visual indicator 520 is a light emitting diode (LED) and the audio transducer 525 is a speaker. These devices may be directly coupled to the power supply 570 so that when activated, they remain on for a duration dictated by the notification mechanism even though the processor 560/961 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with aspects of the present disclosure, the microphone may also serve as an audio sensor to facilitate control of notifications, as will be described below. The system 502 may further include a video interface 576 that enables an operation of an on-board camera to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, the computing device 604, 606, 608 may represent the computing device 120 of FIG. 1, and the server device 602 may represent the server 140 of FIG. 1.

In some aspects, one or more of a source code analyzer 623, a reliable type identifier 624, and a framework library updater 625, may be employed by server device 602. The server device 602 may provide data to and from a client computing device such as a personal computer 604, a tablet computing device 606 and/or a mobile computing device 608 (e.g., a smart phone) through a network 612. By way of example, the computer system described above may be embodied in a personal computer 604, a tablet computing device 606 and/or a mobile computing device 608 (e.g., a smart phone). Any of these aspects of the computing devices may obtain content from the store 616, in addition to receiving graphical data useable to be either pre-processed at a graphic-originating system, or post-processed at a receiving computing system. The content store may include reloadable type data 618.

FIG. 6 illustrates an exemplary mobile computing device 608 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

In accordance with at least one example of the present disclosure, a method for implementing changes made to source code of a program at runtime is provided. The method may include executing the source code in a runtime environment, detecting changes made to the source code at runtime in the runtime environment, determining if the changes were made to a type in the source code identified as reloadable, creating, in response to determining that the changes were made to the type in the source code identified as reloadable, a new version of the type, and performing implementation of the changes to the source code at runtime using the new version of the type.

In accordance with at least one aspect of the above method, the method may include where executing the source code in a runtime environment comprises obtaining the source code, loading the source code in an integrated development environment (IDE), and executing the source code in the runtime environment deployed by the IDE.

In accordance with at least one aspect of the above method, the method may further include updating, in response to determining that the changes were not made to a type in the source code identified as reloadable, the type in-place.

In accordance with at least one aspect of the above method, the method may include where performing implementation of the changes to the source code at runtime using the new version of the type further comprises replacing a runtime representation and one or more existing instances of a previous version of the type in the source code with the new version of the type.

In accordance with at least one aspect of the above method, the method may include where performing implementation of the changes to the source code at runtime using the new version of the type further comprises notifying a framework that was used to construct the source code that the new version of the type has been created and transferring a state from one or more existing instances of a previous version of the type in the source code to the new version.

In accordance with at least one aspect of the above method, the method may further include continuing executing the updated source code with the changes in the runtime environment.

In accordance with at least one aspect of the above method, the method may include where determining if the changes were made to a type in the source code identified as reloadable further comprises determining if the changes were made to a type in the source code identified as reloadable based on a framework library associated with a framework that was used to construct the source code, wherein the framework library comprises a list of predefined types that are marked as reloadable.

In accordance with at least one example of the present disclosure, a computing device for implementing changes made to source code of a program at runtime is provided. The computing device may include a processor and a memory having a plurality of instructions stored thereon that, when executed by the processor, causes the computing device to execute the source code in a runtime environment, detect changes made to the source code at runtime in the runtime environment, determine if the changes were made to a type in the source code identified as reloadable, create, in response to determination that the changes were made to the type in the source code identified as reloadable, a new version of the type, and perform implementation of the changes to the source code at runtime using the new version of the type.

In accordance with at least one aspect of the above computing device, the computing device may include where to execute the source code in a runtime environment comprises to obtain the source code, load the source code in an integrated development environment (IDE), and execute the source code in the runtime environment deployed by the IDE.

In accordance with at least one aspect of the above computing device, the computing device may further be configured to update, in response to determination that the changes were not made to a type in the source code identified as reloadable, the type in-place.

In accordance with at least one aspect of the above computing device, the computing device may include where to perform implementation of the changes to the source code at runtime using the new version of the type comprises to replace a runtime representation and one or more existing instances of a previous version of the type in the source code with the new version of the type.

In accordance with at least one aspect of the above computing device, the computing device may include where to perform implementation of the changes to the source code at runtime using the new version of the type comprises to notify a framework that was used to construct the source code that the new version of the type has been created and transfer a state from one or more existing instances of a previous version of the type in the source code to the new version.

In accordance with at least one aspect of the above computing device, the computing device may further be configured to continue executing the updated source code with the changes in the runtime environment.

In accordance with at least one aspect of the above computing device, the computing device may include where to determine if the changes were made to a type in the source code identified as reloadable further comprises to determine if the changes were made to a type in the source code identified as reloadable based on a framework library associated with a framework that was used to construct the source code, wherein the framework library comprises a list of predefined types that are marked as reloadable.

In accordance with at least one example of the present disclosure, a non-transitory computer-readable medium storing instructions for implementing changes made to source code of a program at runtime is provided. The instructions when executed by one or more processors of a computing device, cause the computing device to execute the source code in a runtime environment, detect changes made to the source code at runtime in the runtime environment, determine if the changes were made to a type in the source code identified as reloadable, create, in response to determination that the changes were made to the type in the source code identified as reloadable, a new version of the type, and perform implementation of the changes to the source code at runtime using the new version of the type.

In accordance with at least one aspect of the above non-transitory computer-readable medium, the instructions when executed by one or more processors of a computing device may include where to execute the source code in a runtime environment comprises to obtain the source code, load the source code in an integrated development environment (IDE), and execute the source code in the runtime environment deployed by the IDE.

In accordance with at least one aspect of the above non-transitory computer-readable medium, the instructions when executed by the one or more processors may further cause the computing device to update, in response to determination that the changes were not made to a type in the source code identified as reloadable, the type in-place.

In accordance with at least one aspect of the above non-transitory computer-readable medium, the instructions when executed by one or more processors of a computing device may include where to perform implementation of the changes to the source code at runtime using the new version of the type comprises to replace a runtime representation and one or more existing instances of a previous version of the type in the source code with the new version of the type.

In accordance with at least one aspect of the above non-transitory computer-readable medium, the instructions when executed by one or more processors of a computing device may include where to perform implementation of the changes to the source code at runtime using the new version of the type comprises to notify a framework used to construct the source code that the new version of the type has been created and transfer a state from one or more existing instances of a previous version of the type in the source code to the new version.

In accordance with at least one aspect of the above non-transitory computer-readable medium, the instructions when executed by the one or more processors may further cause the computing device to continue executing the updated source code with the changes in the runtime environment.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The invention claimed is:

1. A method for implementing changes made to source code of a program at runtime, the method comprising:
   executing the source code in a runtime environment, wherein the source code includes a reloadable type and a non-reloadable type in-place;
   detecting changes made to the source code at runtime in the runtime environment;
   determining if the changes were made to a type in the source code identified as the reloadable type based on a framework that was used to construct the source code, wherein the framework includes a framework library that indicates whether the type in the source code is the reloadable type or the non-reloadable type in-place;
   creating, in response to determining that the changes were made to the type in the source code identified as the reloadable type, a new version of the reloadable type; and
   performing implementation of the changes to the source code at runtime using the new version of the reloadable type.

2. The method of claim 1, wherein executing the source code in the runtime environment comprises:

obtaining the source code;
loading the source code in an integrated development environment (IDE); and
executing the source code in the runtime environment deployed by the IDE.

3. The method of claim 1, further comprising updating, in response to determining that the changes were not made to the type in the source code identified as reloadable, the non-reloadable type in-place.

4. The method of claim 1, wherein performing implementation of the changes to the source code at runtime using the new version of the reloadable type further comprises replacing a runtime representation and one or more existing instances of a previous version of the type in the source code with the new version of the reloadable type.

5. The method of claim 1, wherein performing implementation of the changes to the source code at runtime using the new version of the reloadable type further comprises:
notifying a framework that was used to construct the source code that the new version of the reloadable type has been created; and
transferring a state from one or more existing instances of a previous version of the type in the source code to the new version.

6. The method of claim 1, further comprising continuing executing the updated source code with the changes in the runtime environment.

7. The method of claim 1, wherein determining if the changes were made to a type in the source code identified as reloadable further comprises determining if the changes were made to a type in the source code identified as reloadable based on a framework library associated with a framework that was used to construct the source code, wherein the framework library comprises a list of predefined types that are marked as reloadable.

8. A computing device for implementing changes made to source code of a program at runtime, the computing device comprising:
a processor; and
a memory having a plurality of instructions stored thereon that, when executed by the processor, causes the computing device to:
execute the source code in a runtime environment, wherein the source code includes a reloadable type and a non-reloadable type in-place;
detect changes made to the source code at runtime in the runtime environment;
determine if the changes were made to a type in the source code identified as the reloadable type based on a framework that was used to construct the source code, wherein the framework includes a framework library that indicates whether the type in the source code is the reloadable type or the non-reloadable type in-place;
create, in response to determination that the changes were made to the type in the source code identified as the reloadable type, a new version of the reloadable type; and
perform implementation of the changes to the source code at runtime using the new version of the reloadable type.

9. The computing device of claim 8, wherein to execute the source code in the runtime environment comprises to:
obtain the source code;
load the source code in an integrated development environment (IDE); and
execute the source code in the runtime environment deployed by the IDE.

10. The computing device of claim 8, wherein the computing device is further configured to update, in response to determination that the changes were not made to the type in the source code identified as reloadable, a type in-place.

11. The computing device of claim 8, wherein to perform implementation of the changes to the source code at runtime using the new version of the reloadable type comprises to replace a runtime representation and one or more existing instances of a previous version of the type in the source code with the new version of the reloadable type.

12. The computing device of claim 8, wherein to perform implementation of the changes to the source code at runtime using the new version of the reloadable type comprises to:
notify a framework that was used to construct the source code that the new version of the reloadable type has been created; and
transfer a state from one or more existing instances of a previous version of the type in the source code to the new version.

13. The computing device of claim 8, wherein the computing device is further configured to continue executing the updated source code with the changes in the runtime environment.

14. The computing device of claim 8, wherein to determine if the changes were made to a type in the source code identified as reloadable further comprises to determine if the changes were made to a type in the source code identified as reloadable based on a framework library associated with a framework that was used to construct the source code, wherein the framework library comprises a list of predefined types that are marked as reloadable.

15. A non-transitory computer-readable medium storing instructions for implementing changes made to source code of a program at runtime, the instructions when executed by one or more processors of a computing device, cause the computing device to:
execute the source code in a runtime environment, wherein the source code includes a reloadable type and a non-reloadable type in-place;
detect changes made to the source code at runtime in the runtime environment;
determine if the changes were made to a type in the source code identified as the reloadable type based on a framework that was used to construct the source code, wherein the framework includes a framework library that indicates whether the type in the source code is the reloadable type or the non-reloadable type in-place;
create, in response to determination that the changes were made to the type in the source code identified as the reloadable type, a new version of the reloadable type; and
perform implementation of the changes to the source code at runtime using the new version of the reloadable type.

16. The non-transitory computer-readable medium of claim 15, wherein to execute the source code in the runtime environment comprises to:
obtain the source code;
load the source code in an integrated development environment (IDE); and
execute the source code in the runtime environment deployed by the IDE.

17. The non-transitory computer-readable medium of claim 15, wherein the instructions when executed by the one or more processors further cause the computing device to update, in response to determination that the changes were not made to the type in the source code identified as the reloadable type, the non-reloadable type in-place.

18. The non-transitory computer-readable medium of claim 15, wherein to perform implementation of the changes to the source code at runtime using the new version of the reloadable type comprises to replace a runtime representation and one or more existing instances of a previous version of the type in the source code with the new version of the reloadable type.

19. The non-transitory computer-readable medium of claim 15, wherein to perform implementation of the changes to the source code at runtime using the new version of the reloadable type comprises to:
- notify a framework used to construct the source code that the new version of the reloadable type has been created; and
- transfer a state from one or more existing instances of a previous version of the type in the source code to the new version.

20. The non-transitory computer-readable medium of claim 15, wherein the instructions when executed by the one or more processors further cause the computing device to continue executing the updated source code with the changes in the runtime environment.

* * * * *